United States Patent [19]
Woo

[11] Patent Number: 5,720,539
[45] Date of Patent: Feb. 24, 1998

[54] APPARATUS FOR DETECTING A PROJECTION ANGLE IN A PROJECTION SYSTEM FOR DISPLAYING A PICTURE

[75] Inventor: Seong-Jae Woo, Kyeongki-do, Rep. of Korea

[73] Assignee: Daewoo Electronics Co., Inc., Seoul, Rep. of Korea

[21] Appl. No.: 757,508

[22] Filed: Nov. 27, 1996

[30] Foreign Application Priority Data

Nov. 29, 1995 [KR] Rep. of Korea .................. 95-44557

[51] Int. Cl.$^6$ ............................................. G03B 21/14
[52] U.S. Cl. ................................... 353/69; 353/70
[58] Field of Search ........................ 353/69, 70, 101, 353/122; 348/745, 746, 747, 806

[56] References Cited

U.S. PATENT DOCUMENTS

| | | | |
|---|---|---|---|
| 4,422,153 | 12/1983 | Arai et al. | 353/69 |
| 4,695,693 | 9/1987 | Staats et al. | 219/10.55 |
| 5,468,940 | 11/1995 | Kang | 219/746 |
| 5,537,168 | 7/1996 | Kitagishi et al. | 353/69 |
| 5,548,357 | 8/1996 | Appel et al. | 353/69 |
| 5,557,353 | 9/1996 | Stahl | 353/69 |
| 5,584,552 | 12/1996 | Nam-Su et al. | 353/69 |

*Primary Examiner*—William Dowling
*Attorney, Agent, or Firm*—Foley & Lardner

[57] ABSTRACT

An apparatus for detecting a projection angle of a projection system for displaying a picture, which automatically detects a projection angle of a projection lens with respect to a screen and provides computed compensation amounts to an apparatus for pre-compensating an asymmetrical picture, is disclosed. Even when the projection lens installed in the projection system for displaying a picture is disposed at an upward or a downward projection angle, the projection angle is automatically detected and the detected projection angle is provided as the compensation amount to the apparatus for pre-compensating an asymmetrical picture. Consequently, the user does not have to engage in a cumbersome process of setting up the compensation amount through trial and error.

24 Claims, 7 Drawing Sheets

APPARATUS FOR DETECTING A PROJECTION ANGLE IN A PROJECTION SYSTEM FOR DISPLAYING A PICTURE

BACKGROUND OF THE INVENTION

1. Field of the Invention

The present invention relates to an apparatus for detecting a projection angle in a projection system for displaying a picture which automatically detects a projection angle of a projection lens with respect to a screen and provides computed compensation amounts to an apparatus for pre-compensating an asymmetrical picture. The present invention is an improved invention of U.S. patent application Ser. No. 08/686,100, which was filed on Jul. 24, 1996 in the United States Patent and Trademark Office, and is presently pending. The contents of U.S. patent application Ser. No. 08/686,100 are described as reference in the present Patent Application.

2. Description of the Prior Art

Generally, a picture display system for displaying a color picture is divided broadly into direct-view picture display systems, represented by CRTs (Cathode Ray Tubes), and projection systems for displaying a picture (hereinafter, referred to as "projectors"), represented by LCDs (Liquid Crystal Displays). Since CRTs are restricted in their size due to their inherent structure, they cannot provide large-scale color screens. On the other hand, LCDs are able to provide large-scale color screens with slim and light structures, although with a disadvantage of an optical loss.

Therefore, a projector has been widely used. This projector breaks up a color picture signal according to color into RGB light signals, and optically adjusts the RGB signal broken up according to color on the basis of the components of the color signal. The picture signal which is optically adjusted, is magnified via a projection lens and is displayed on a relatively large-scale screen.

Figure 1:
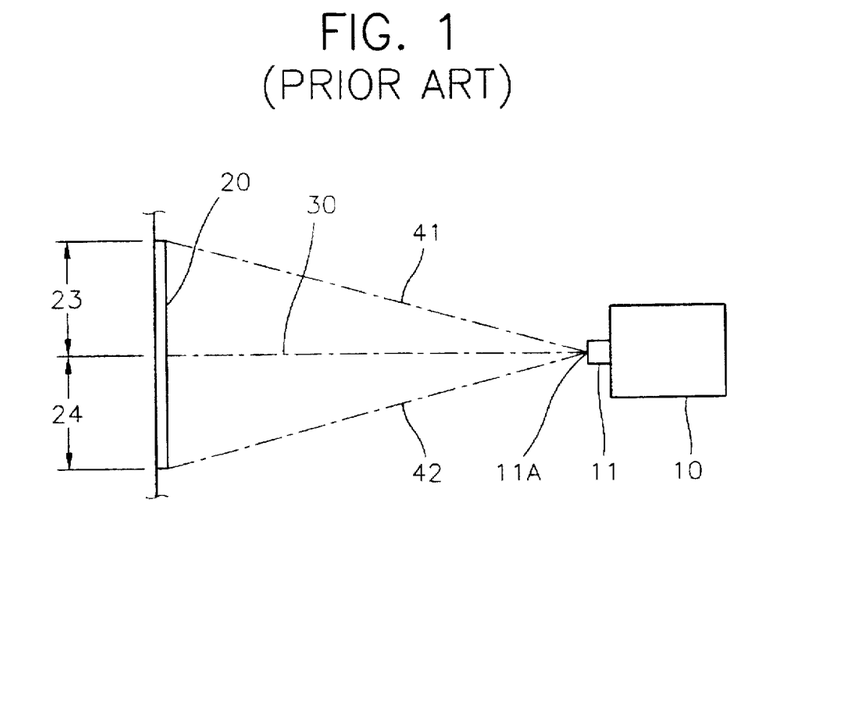
FIGS. 1 and 2 are views for showing respectively the arrangement of a projection lens with respect to a screen, and the shape of a picture projected onto the screen by the projector, when the picture projected onto the screen is normal.
Figure 2:
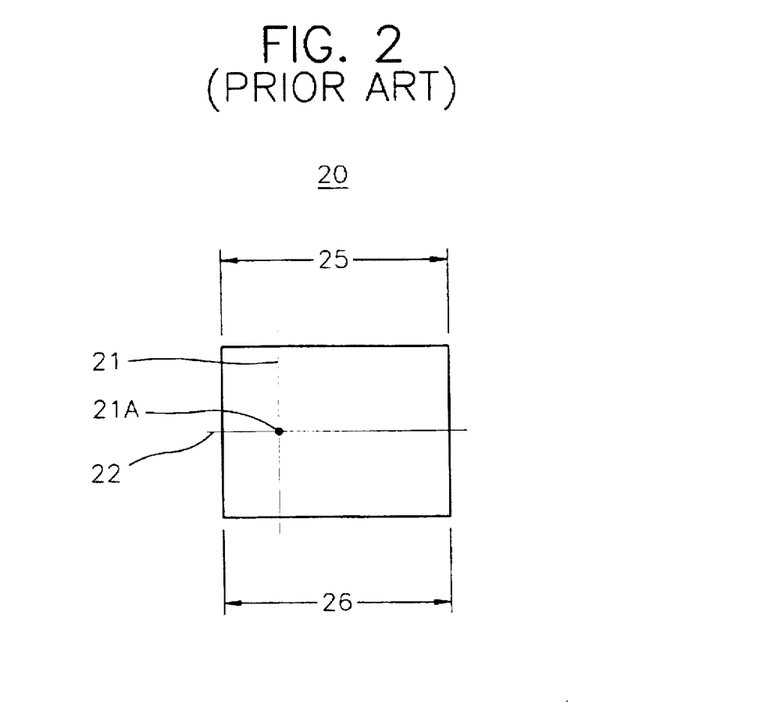

FIGS. 1 and 2 are views for showing respectively the arrangement of a projection lens with respect to a screen, and the shape of a picture projected onto the screen by the projector, when the picture projected onto the screen is normal. As shown in FIGS. 1 and 2, a center axis 30 is a line connecting a point on a first traverse axis 22, which perpendicularly crosses a first longitudinal axis 21 on a screen 20 at a midpoint point 21A, with a center point 11A of a projection lens 11 of a projector 10. When center axis 30 forms an approximate right angle with respect to the surface of screen 20, a first projection distance 41 which ranges from center point 11A of projection lens 11 to an upper end of the picture, i.e., screen 20, becomes equal to a second projection distance 42 which ranges from center point 11A of projection lens 11 to a lower end of the picture, i.e., screen 20. Also, a third distance 13 which ranges from center axis 30 to the upper end of the picture, i.e., screen 20, becomes equal to a fourth distance 24 which ranges from center axis 30 to the lower end of the picture, i.e., screen 20, so a width 25 of the upper end of the picture becomes approximately equal to a width 26 of the lower end of the picture. As a result, as a whole, the picture is projected in the shape of a rectangle onto screen 20 without a keystoning or trapezoidal distortion.

Figure 3:
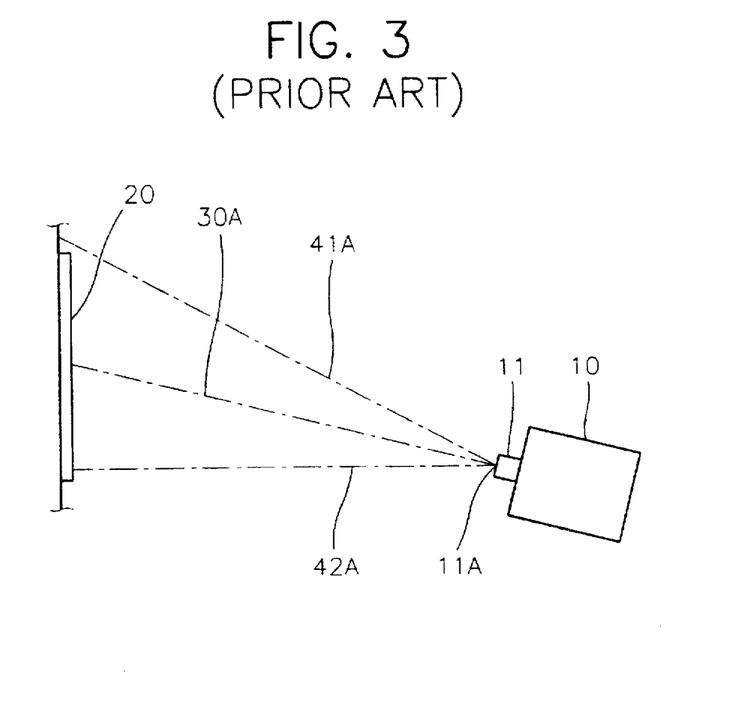
FIGS. 3 and 4 are views for showing respectively an arrangement of the projection lens with respect to the screen, and the shape of the picture projected onto the screen by the projector, when the projection lens has an upward projection angle with respect to the screen.
Figure 4:
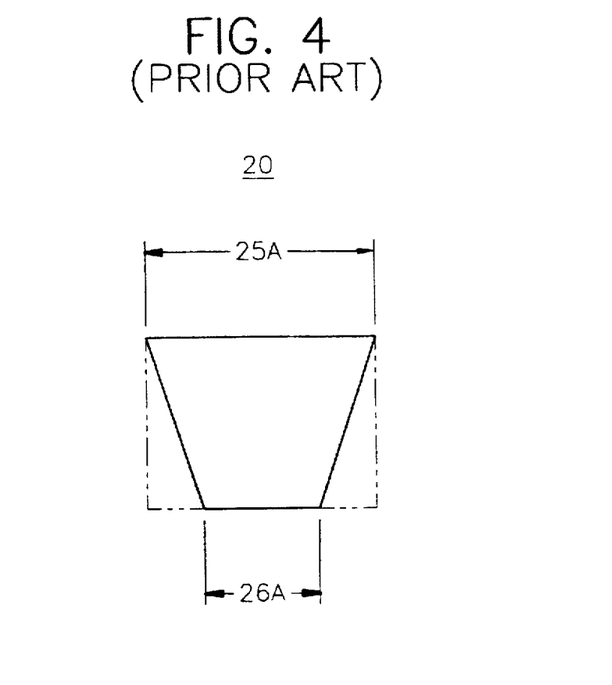
Figure 7:
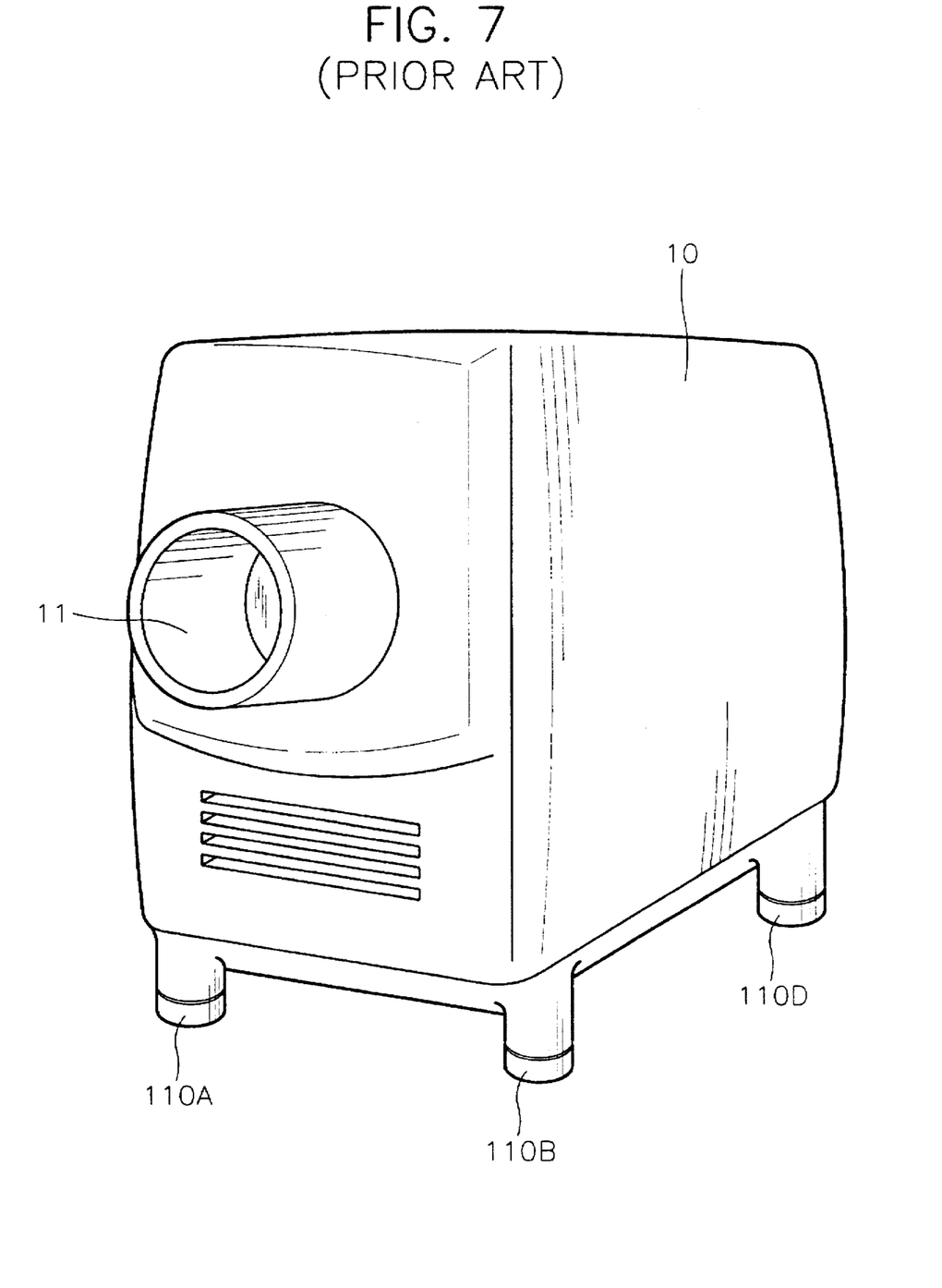
FIG. 7 is a perspective view for showing projection angle adjusting knobs which are installed in a bolster portion of a conventional projector.

FIGS. 3 and 4 are views for showing respectively an arrangement of the projection lens with respect to the screen, and the shape of the picture projected onto the screen by the projector, when the projection lens has an upward projection angle with respect to the screen. FIG. 7 is a perspective view for showing projection angle adjusting knobs which are installed in a bolster portion in a conventional projector. For example, as shown in FIGS. 3 and 4, when a pair of projection angle adjusting knobs 110A and 110B which are disposed frontward as shown in FIG. 7 so that projection lens 11 of projector 10 can be placed below a first plane (not shown) which vertically traverses first longitudinal axis 22 with reference to the surface of screen 20, a center axis 30A has an upward projection angle with reference to the first plane. At this time, a fast projection distance 41A is different from a second projection distance 42A, and the picture projected onto screen 20 has the shape of a reverse trapezoid in that a width 25A of the upper end thereof is wider than a width 26A of the lower end thereof.

Figure 5:
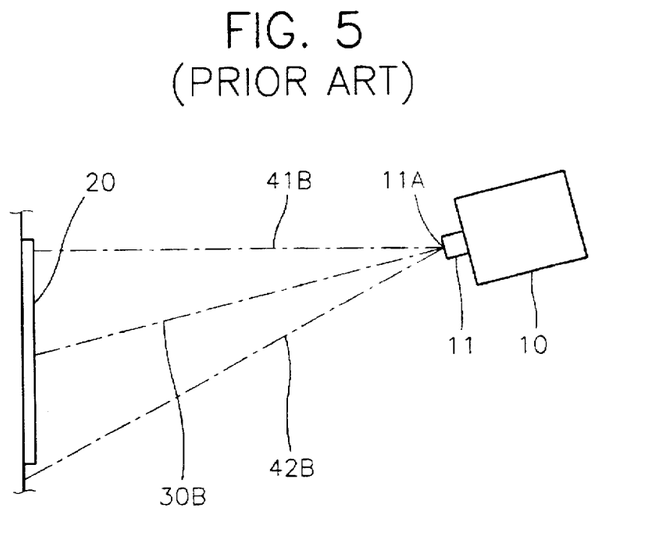
FIGS. 5 and 6 are respectively views for showing an arrangement of the projection lens with respect to the screen, and the shape of the picture projected onto the screen by the projector, when the projection lens has a downward projection angle with respect to the screen.
Figure 6:
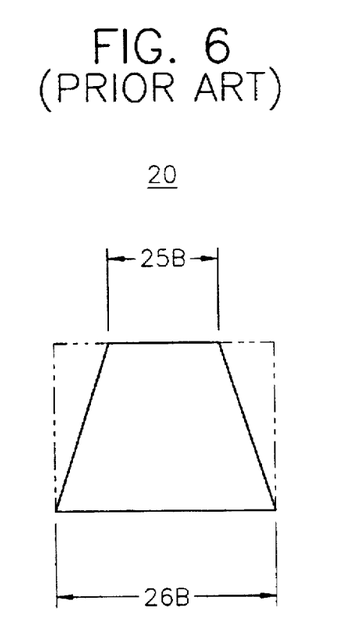

FIGS. 5 and 6 are views for showing respectively an arrangement of the projection lens with respect to the screen, and the shape of the picture projected onto the screen by the projector, when the projection lens has a downward projection angle with respect to the screen. FIG. 7 is a perspective view for showing projection angle adjusting knobs which are installed in a bolster portion of a conventional projector. As another example, as shown in FIGS. 5 and 6, when a pair of projection angle adjusting knobs 110C and 110D which are disposed rearward as shown in FIG. 7 so that projection lens 11 of projector 10 can be placed above a first plane (not shown) which vertically traverses first longitudinal axis 22 with reference to the surface of screen 20, a center axis 30A has a downward projection angle with reference to the first plane. At this time, a first projection distance 41B is different from a second projection distance 42B, and the picture projected onto screen 20 has the shape of a trapezoid in that a width 25B of the upper end thereof is smaller than a width 26B of the lower end thereof, contrary to the picture in FIG. 4.

As described above, when the projection lens of the projector is arranged at an upward or downward projection angle with respect to the screen, the magnified picture that is projected onto screen 20 is distorted due to keystoning, i.e., the trapezoidal distortion. In the end, the distorted picture will inevitably irritate a user, so pre-compensation for an asymmetrical or distorted picture that is projected onto the screen due to an occurrence of keystoning, is required.

In U.S. Pat. No. 5,548,357, while a transparency, i.e., a slide or a projection panel display, is projected onto a screen, the focus distortion is corrected by placing the transparency on an easel whose angle with respect to the horizontal is manually adjustable. The angle of final projection is selected to obtain an optimum focus on the screen. But, since a user has to select the angle of final projection through trial and error, when the angle of final projection is not properly inputted, the user cannot obtain the optimum focus with respect to a picture onto the screen.

In an apparatus for pre-compensating an asymmetrical picture in a projection system for displaying a picture, when a user manually adjusts projection angle adjusting knobs in order to set up an upward projection angle or a downward projection angle, the picture becomes asymmetrical in accordance with the projection angle of a projection lens with respect to a screen. Then, the user artificially sets up a compensation amount by a keyboard or a remote control unit in order to pre-compensate for the asymmetrical picture. Subsequently, a method for pre-compensating an asymmetrical picture is performed by a pre-compensating apparatus in order to pre-compensate for a picture which is to be projected onto the screen on the basis of the compensation amount.

When the user manually sets up the compensation amount by means of the keyboard, tho user increases or decreases the compensation amount while carefully looking at the picture projected onto the screen. Therefore, since the user has to determine the compensation amount through trial and error, the user always engages in a cumbersome process while executing the method for pre-compensating an asymmetrical picture. Also, since the compensation amount is not properly inputted when the user's judgement is inaccurate, the pre-compensation for the asymmetrical picture is inaccurately executed.

SUMMARY OF THE INVENTION

Therefore, it is an object of the present invention to provide an apparatus for detecting a projection angle, which in a projection system for displaying a picture, automatically detects a projection angle in response to the arrangement of a projection lens with respect to a screen and provides the detected projection angle as a compensation amount to an apparatus for pre-compensating an asymmetrical picture.

In order to achieve the above object, the present invention provides the apparatus for detecting a projection angle of a projection system for displaying a picture, which comprises:

means for adjusting a projection angle, the projection angle adjusting means being screw-connected with a screw hole formed in a bolster portion of the projection system for displaying a picture in order to move upwards or downwards when a user rotates an adjusting knob by their hand;

projection angle detecting means for providing a light detection signal by a photo-detector operating through an optical connection to logic patterns of a first gear member which rotates to screw-connect to a power transmission member when the power transmission member is moved upwards or downwards by the projection angle adjusting means;

computing means for computing a projection angle of a projection lens with respect to a screen on the basis of the light detection signal from the projection angle detecting means and for providing the computed projection angle to a pre-compensating means for pre-compensating an asymmetrical picture; and projection angle storing means for storing data used when the computing means computes the projection angle on the basis of the combination of logic patterns of the first gear member in order to read out the data in a lookup table manner.

In the apparatus for detecting a projection angle of a projection system for displaying a picture, when the projection lens installed in the projection system for displaying a picture is disposed at an upward or a downward projection angle, the projection angle is automatically detected and the detected projection angle is provided as a compensation amount to the apparatus for pre-compensating an asymmetrical picture. Consequently, the user does not have to engage in a cumbersome process of setting up the compensation amount through trial and error.

BRIEF DESCRIPTION OF THE DRAWINGS

The above objects and other advantages of the present invention will become more apparent by describing in detail preferred embodiments thereof with reference to the attached views, in which.

DESCRIPTION OF THE PREFERRED EMBODIMENTS

A description will be given below in detail with reference to the accompanying views to the configuration and the operation of an apparatus for detecting a projection angle in a projection system for displaying a picture according to an embodiment of the present invention.

Figure 8:
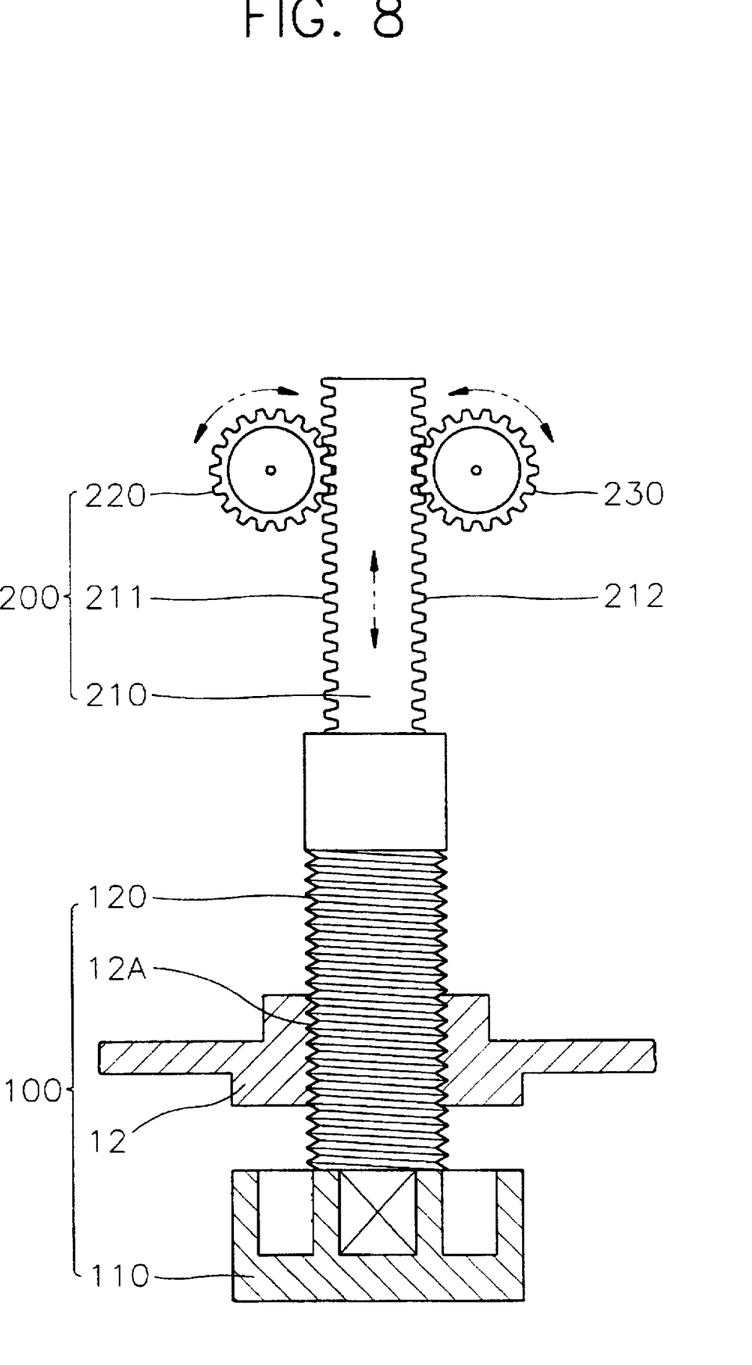
FIG. 8 is a view for showing structures of a projection angle adjusting section and a projection angle detection section of an apparatus for detecting a projection angle according to one embodiment of the present invention.
Figure 9:
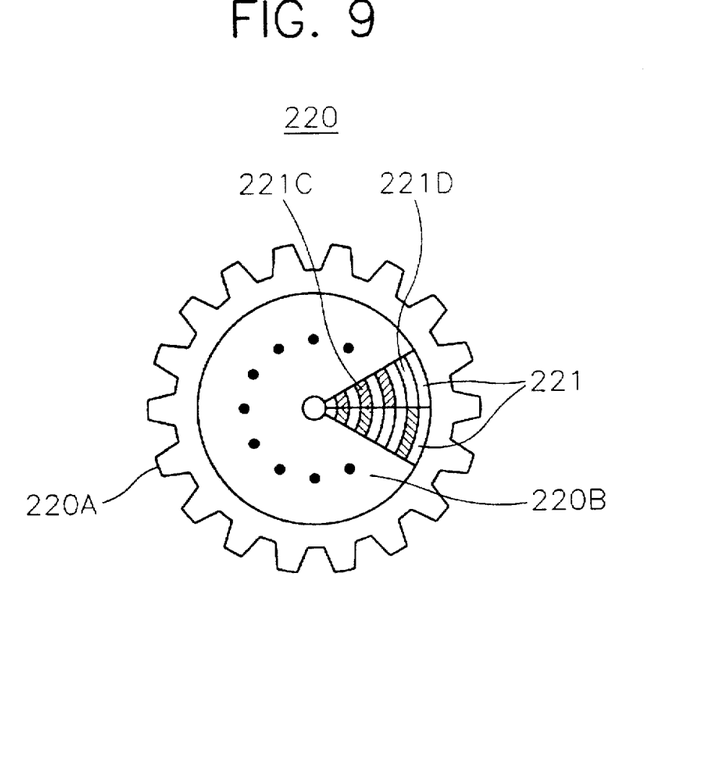
FIG. 9 is a view for showing a structure of a gear member included in the projection angle detecting section shown in FIG. 8.
Figure 10:
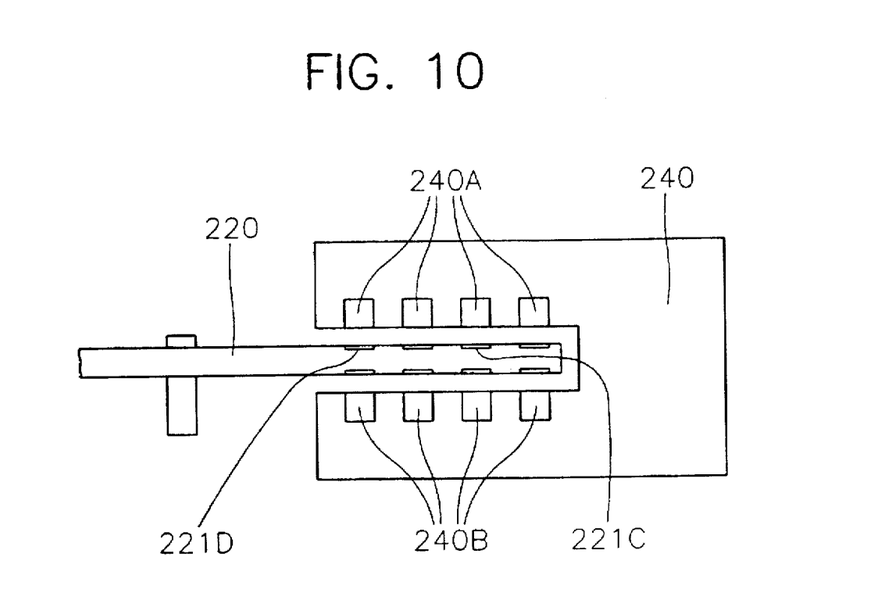
FIG. 10 is a view for showing a structure of the projection angle detecting section in which light-emitting elements are respectively disposed in opposition to light-receiving elements, and in which the gear member shown in FIG. 9 is positioned therebetween.
Figure 11:
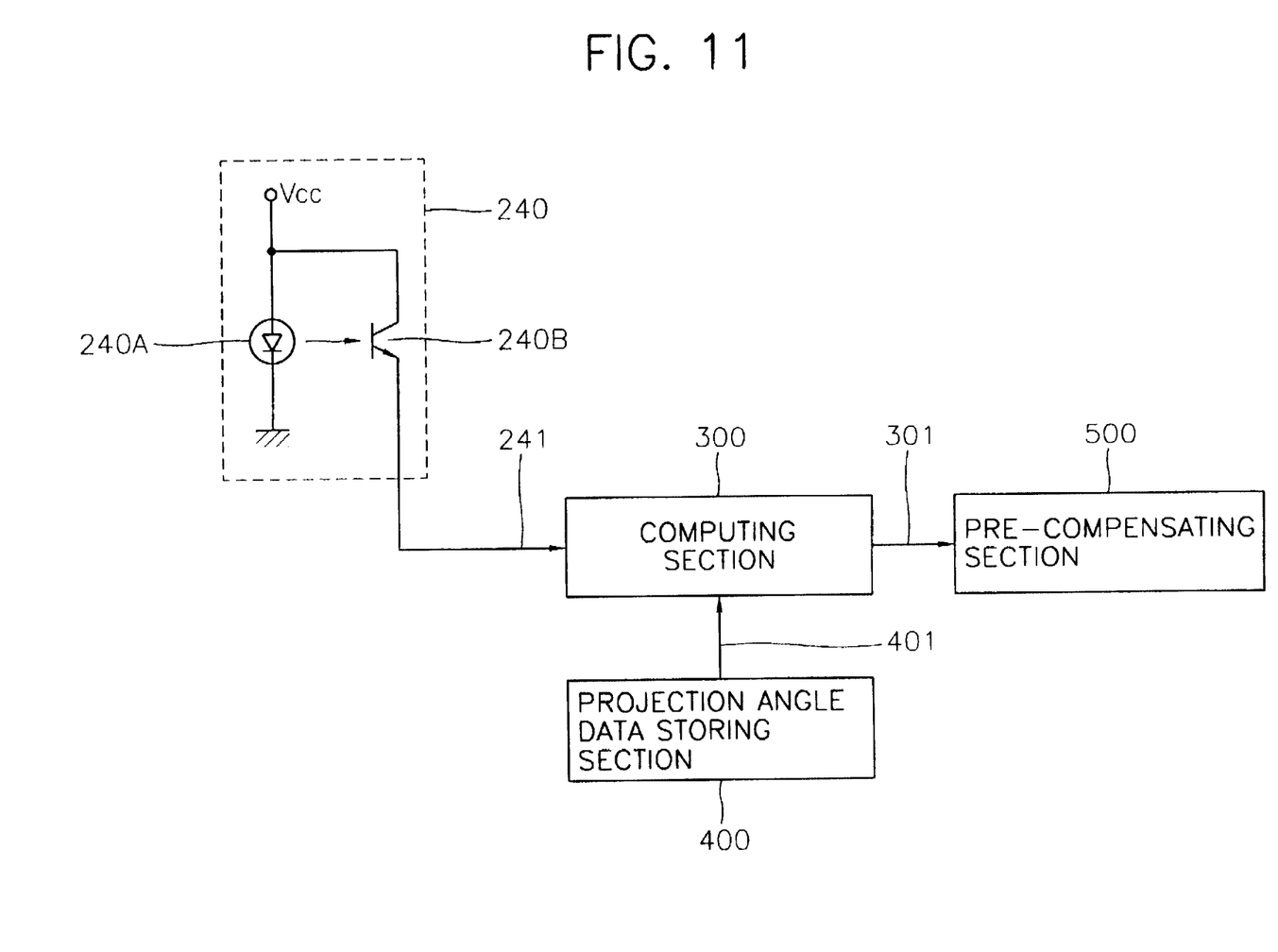
FIG. 11 is a circuit block diagram for showing the apparatus for detecting a projection angle according to an embodiment of the present invention and which includes both the light-emitting elements and the light-receiving elements shown in FIG. 10.

FIG. 8 is a view for showing structures of a projection angle adjusting section and a projection angle detection section in an apparatus for detecting a projection angle according to one embodiment of the present invention. FIG. 9 is a view for showing a structure of a gear member included in the projection angle detecting section shown in FIG. 8. FIG. 10 is a view for showing a structure of the projection angle detecting section in which light-emitting elements are respectively disposed in opposition to light-receiving elements, and in which the gear member shown in FIG. 9 is positioned therebetween. FIG. 11 is a circuit block diagram for showing the apparatus for detecting a projection angle according to an embodiment of the present invention, and which includes both the light-emitting elements and the light-receiving elements shown in FIG. 10.

As shown in FIGS. 8 to 11, an apparatus 50 for detecting a projection angle comprises a projection angle adjusting section 100, a projection angle detecting section 200, a computing section 300 and a projection angle data storing section 400.

As shown In FIG. 8, projection angle adjusting section 100 comprises an adjusting knob 110 and a body 120. Projection angle adjusting section 100 screw-connects with a screw hole 12A formed in a holster portion 12 of projector 10 in order to move upwards or downwards when a user rotates adjusting knob 110 by hand. As shown in FIG. 7, in order to adjust the projection angle of projection lens 11 with respect to screen 20, the user rotates clockwise or counterclockwise a pair of projection angle adjusting knobs 110A and 110B disposed frontward or a pair of projection angle adjusting knobs 110C and 110D disposed rearward. Adjusting knob 110 is integrally formed with body 120 having a cylindrical shape and body 120 has a screw structure on a peripheral surface thereof.

As shown in FIGS. 8 to 10, a projection angle detecting section 200 comprises a power transmission member 210, a first gear member 220, a second gear member 230 and a photo-detector 240. In one embodiment of projection angle detecting section 200, in projection angle detecting section 200, a light deletion signal 241 is generated by photo-detector 240, which operates through an optical connection with logic patterns of first gear member 220, which rotates through a screw connection to power transmission member 210 when power transmission member 210 is moved upwards or downwards by projection angle adjusting section 100. Power transmission member 210 moves upwards or downwards when projection angle adjusting section 100 rotates clockwise or counterclockwise along with the guide of the screw hole 12A of projector 10. Namely, power transmission member 210 has the shape of a rack and connects to body 120 of projection angle adjusting section 100 by means of a ball bearing (not shown) in order to move upwards or downwards when body 120 of projection angle adjusting section 100 rotates clockwise or counterclockwise and simultaneously moves upwards or downwards.

As shown in FIG. 9, first gear member 220 includes a first logic pattern portion 221 on both surface thereof and connects to a first screw forming portion 211 of power transmission member 210 in order to rotate when power transmission member 210 moves upwards or downwards. First gear member 220 includes a first screw portion 220A, which is formed on a peripheral surface of first gear member 220 in order to rotate together with first screw forming portion 211 of power transmission member 210 by being engaged therewith, and includes a first base panel 220B, which is made of a transparent material and is arranged at a central portion of first gear member 220. First base panel 220B has first logic pattern portion 221, which is formed with a plurality of fan shapes having the same central angle and is radially formed with reference to a central point of first base panel 220B on surfaces of first base panel 220B in order to transmit or cut off light signals from light-emitting elements 240A included a photo-detector 240. First logic pattern portion 221 includes both a first light transmitting pattern 221D and a first light cutting pattern 221C which are disposed sequentially in order to represent the predetermined bits of logic value by light signals which are transmitted or cut off. Light transmitting pattern 221D transmits the light signal from light-emitting element 240A and represents the high level of a digital value. Light cutting pattern 221C cuts off the light signal from light-emitting element 240A and represents the low level of a digital value.

As shown in FIG. 9, second gear member 230 screw-connects to a second screw forming portion 212 of power transmission member 210 and supports projection angle adjusting section 100. Second gear member 230 includes a second screw portion 230A, which is formed on a peripheral surface of second gear member 230 in order to rotate together with second screw forming portion 212 of power transmission member 210 while being engaged therewith.

As shown in FIG. 10, photo-detector 240 includes the plurality of light-emitting elements 240A and the plurality of light-receiving elements 240B which are disposed in one to one opposition to each other, and which have each of logic patterns of first gear member 220 placed therebetween, and photo-detector 240 provides a light detection signal 241 by means of light-emitting elements 240A and light-receiving elements 240B.

In another embodiment of projection angle detecting section 200, power transmission member 210 has the shape of a worm and is integrally formed with body 120 of projection angle adjusting section 100. First gear member 220 has first logic pattern portion 221 on both surfaces thereof, and is screw-connected to a first side portion of a screw forming portion which corresponds to first screw forming portion 211 or second screw forming portion 212 shown in FIG. 8, and is formed on a peripheral surface of power transmission member 210 in order to rotate by means of power transmission member 210. Second gear member 230 screw-connects to a portion opposite to the first side portion of the screw forming portion of power transmission member 210, and supports projection angle adjusting section 100. Photo-detector 240 includes the plurality of light-emitting elements 240A and the plurality of light-receiving elements 240B which are disposed in one to one opposition to each other, and which have each of first logic pattern portion 221 of first gear member 220 placed therebetween. Light signals from light-emitting elements 240A are transmitted or cut off by first logic pattern portion 221 of first gear member 220 and are received by light-receiving elements 240B in order to provide light detection signal 241, which represents the high or low level of a digital value with pre determined bits.

In one embodiment and another embodiment of projection angle detecting section 200, second gear member 230 for supporting projection angle adjusting section 100 can be included or not included as a structural element.

As shown in FIG. 11, computing section 300 computes the projection angle of projection lens 11 with respect to screen 20 on the basis of light detection signal 241 from projection angle detecting section 200 and provides the computed projection angle to a pre-compensating section 500 for pre-compensating an asymmetrical picture.

As shown in FIG. 11, projection angle storing section 400 stores data 401, which is used when computing section 300 computes the projection angle on the basis of the combination of logic patterns of first gear member 220, in order to read out the data in a manner (or a system) of a lookup table.

Hereinafter, a description of the operation of the apparatus for detecting a projection angle of a projection system for displaying a picture according to an embodiment of the present invention which has the aforementioned configuration, will be provided as follows.

As shown in FIG. 7, when a user rotates clockwise or counterclockwise the pair of adjusting knobs disposed frontward 110A and 110B or the pair of adjusting knobs disposed rearward 110C and 110D, body 120 of projection angle adjusting section 100 rotates to screw-connects with screw hole 12A of bolster portion 12 included in projector 10 (see FIG. 8) so that an external protrusion portion of projection angle adjusting section 100 becomes longer or shorter. Therefore, the projection angle of projection lens 11 with respect to screen 20 is adjusted upwards or downwards. In one embodiment of projection angle detecting section 200, when body 120 of projection angle adjusting section 100 rotates clockwise or counterclockwise, power transmission member 210 moves upwards or downwards while maintaining a current orientation. In another embodiment of projection angle detecting section 200, power transmission member 210 follows the motion of projection angle adjusting section 100. Accordingly, in one embodiment of projection angle detecting section 200, first and second gear members 220 and 230, both of which are respectively engaged with first and second screw forming portions 211 and 212 of power transmission member 210, rotate in directions opposite to each other. In another embodiment of projection angle detecting section 200, first and second gear members 220 and 230, both of which are respectively engaged with both side portions of the screw forming portion of power transmission member 210, rotate in directions opposite to each other.

Then, as shown in FIG. 10, first light transmitting pattern 221D and first light cutting pattern 221C of first logic pattern portion 221, which are included in first gear member 220, respectively transmit or cut off the light signals from light-emitting elements 240A included in photo-detector 240. The transmitted or cut-off light signals are received by light-receiving elements included in photo-detector 240 and are outputted as light detection signal 241, which contains four-bit digital data. First light transmitting pattern 221D transmits the light signal from light-emitting elements 240A and represents the high level of a digital value. First light cutting pattern 221C cuts off the light signal from light-emitting elements 240A and represents the low level of a digital value. Light detection signal 241 is provided to computing section 300.

As shown in FIG. 11, computing section 300 computes the projection angle of projection lens 11 with respect to screen 20 on the basis of light detection signal 241 from projection angle detecting section 200 and provides the computed projection angle as the compensation amount to pre-compensating section 500 for pre-compensating an asymmetrical picture. Namely, since projection angle storing section 400 has stored projection angle data, which is used for computing projection angle of projector 10, i.e., an angle of inclination, on the basis of an angle of a rotation of first gear member 220, which is rotated by projection angle adjusting section 100, computing section 300 reads out the data stored in projection angle storing section 400 and computes the projection angle on the basis of read data 401. As a result, pre-compensating section 500 deletes pixels of an asymmetrical picture on the basis of the compensation amount and a compensation direction and supplements blanking data to the pixel-deleted portion of the picture. The pre-compensated picture signal data is provided to projector 10, so projector 10 projects a normal picture onto screen 20.

In the apparatus for detecting a projection angle of a projection system for displaying a picture according to the present invention, even when the projection lens installed in the projection system for displaying a picture is disposed at an upward or a downward projection angle, the projection angle is automatically detected and the detected projection angle is provided as the compensation amount to the apparatus for pre-compensating an asymmetrical picture. Consequently, the user does not have to engage in a cumbersome process of setting up the compensation amount through trial and error.

While the present invention has been particularly shown and described with reference to particular embodiments thereof, it will be understood by those skilled in the art that various changes in form and details may be effected therein without departing from the scope of the invention as defined by the appended claims.

What is claimed is:

1. An apparatus for detecting a projection angle of a projection system for displaying a picture, said apparatus comprising:

means for adjusting a projection angle, said projection angle adjusting means being screw-connected with a screw hole formed in a bolster portion of said projection system for displaying a picture in order to move upwards or downwards when a user rotates an adjusting knob by their hand;

projection angle detecting means for providing a light detection signal by a photo-detector operating through an optical connection to logic patterns of a first gear member which rotates to screw-connects to a power transmission member when said power transmission member is moved upwards or downwards by said projection angle adjusting means;

computing means for computing a projection angle of a projection lens with respect to a screen on the basis of the light detection signal from said projection angle detecting means, and for providing the computed projection angle to a pre-compensating means for pre-compensating an asymmetrical picture; and projection angle storing means for storing data used when said computing means computes the projection angle on the basis of the combination of logic patterns of said first gear member in order to read out the data in a lookup table manner.

2. The apparatus for detecting a projection angle of a projection system for displaying a picture as claimed in claim 1, wherein said projection angle adjusting means comprises an adjusting knob rotated clockwise or counter-clockwise by a user's hand; and a body having a cylindrical shape and having a screw structure on a peripheral surface thereof in order to screw-connect to said screw hole of said projection system for displaying a picture, said body integrally being formed with said adjusting knob.

3. The apparatus for detecting a projection angle of a projection system for displaying a picture as claimed in claim 1, wherein said projection angle detecting means comprises a power transmission member having a rack shape and connecting with said body of said projection angle adjusting means by means of a ball bearing, in order to move upwards or downwards when said projection angle adjusting means rotates clockwise or counterclockwise along with said screw hole of said projection system for displaying a picture to simultaneously move upwards or downwards;

a first gear member having logic patterns on both surfaces thereof and connecting with a first screw forming portion of said power mission member in order to rotate when said power transmission member moves upwards or downwards;

a second gear member, screw-connecting with a second screw forming portion of said power transmission member, for supporting said projection angle adjusting means; and a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and said light-receiving elements.

4. The apparatus for detecting a projection angle of a projection system for displaying a picture as claimed in claim 3, wherein said first gear member comprises a first screw portion formed on a peripheral surface thereof in order to rotate together with with said first screw forming portion of said power transmission member while being engaged therewith; and a first base panel which is comprised of a transparent material and is arranged at a central portion of said first gear member.

5. The apparatus for detecting a projection angle of a projection system for displaying a picture as claimed in claim 4, wherein said first base panel having a first logic pattern portion formed with a plurality of fan shapes which have the same central angle and are radially formed with reference to a central point of said first base panel on both surfaces of said first base panel in order to transmit or cut off light signals from said light-emitting elements included in said photo-detector.

6. The apparatus for detecting a projection angle of a projection system for displaying a picture as claimed in claim 5, wherein said first logic pattern portion includes both a first light transmitting pattern and a first light cutting pattern disposed sequentially in order to represent predetermined bits of logic value by light signals which are transmitted or cut off.

7. The apparatus for detecting a projection angle of a projection system for displaying a picture as claimed in claim 6, wherein said first light transmitting pattern transmits the light signal from said light-emitting element and represents a high level of a digital value.

8. The apparatus for detecting a projection angle of a projection system for displaying a picture as claimed in claim 6, wherein said first light cutting pattern cuts off the light signal from said light-emitting element and represents a low level of a digital value.

9. The apparatus for detecting a projection angle of a projection system for displaying a picture as claimed in claim 1, wherein said computed projection angle is a compensation amount for pre-compensating an asymmetrical picture.

10. The apparatus for detecting a projection angle in a projection system for displaying a picture as claimed in claim 1, wherein said projection angle detecting means comprises a power transmission member having a rack shape and connecting with said body of said projection angle adjusting means by means of a ball bearing in order to move upwards or downwards when said projection angle adjusting means rotates clockwise or counterclockwise along with said screw hole of said projection system for displaying a picture to simultaneously move upwards or downwards;

a first gear member having logic patterns on both surfaces thereof and connecting with a first screw forming portion of said power transmission member in order to rotate when said power transmission member moves upwards or downwards; and a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and said light-receiving elements.

11. The apparatus for detecting a projection angle of a projection system for displaying a picture as claimed in claim 1, wherein said projection angle detecting means comprises a power transmission member having the shape of a worm, said power transmission member being integrally formed with said projection angle adjusting means;

a first gear member having logic patterns on both surfaces thereof and screw-connecting with a first side portion of a screw forming portion formed on a peripheral surface of said power transmission member in order to rotate by means of said power transmission member;

a second gear member screw-connecting with a portion opposite to said first side portion of said screw forming portion of said power transmission member, and being for supporting projection angle adjusting means; and a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and light-receiving elements.

12. The apparatus for detecting a projection angle of a projection system for displaying a picture as claimed in claim 1, wherein said projection angle detecting means comprises a power transmission member having the shape of a worm, said power transmission member being integrally formed with said projection angle adjusting means;

a first gear member having logic patterns on both surfaces thereof and connecting with a first screw forming portion of said power transmission member in order to rotate when said power transmission member moves upwards or downwards; and a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and said light-receiving elements.

13. An apparatus for detecting a projection angle of a projection system for displaying a picture, said apparatus comprising:

an adjusting knob rotated clockwise or counterclockwise by a user's hand;

an adjusting knob body having a cylindrical shape and having a screw structure on a peripheral surface thereof in order to screw-connect to a screw hole of said projection system for displaying a picture, said body integrally being formed with said adjusting knob;

a power transmission member having a rack shape and connecting with said adjusting knob body by means of a ball bearing, in order to move upwards or downwards when said adjusting knob body rotates clockwise or counterclockwise along with said screw hole of said projection system for displaying a picture to simultaneously move upwards or downwards;

a first gear member having logic patterns on both surfaces thereof and connecting with a first screw forming portion of said power transmission member in order to rotate when said power transmission member moves upwards or downwards;

a second gear member, screw-connecting with a second screw forming portion of said power transmission member, for supporting said projection angle adjusting means;

a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and said light-receiving elements;

computing means for computing a projection angle of a projection lens with respect to a screen on the basis of the light detection signal from said photo-detector, and for providing the computed projection angle to a pre-compensating mere for pre-compensating an asymmetrical picture; and projection angle storing means for storing data used when said computing means computes the projection angle on the basis of the combination of logic patterns of said first gear member in order to read out the data in a lookup table manner.

14. The apparatus for detecting a projection angle of a projection system for displaying a picture as claimed in claim 13, wherein said first gear member comprises a first screw portion formed on a peripheral surface thereof in order to rotate together with with said first screw forming portion of said power transmission member while being engaged therewith; and a first base panel which is comprised of a transparent material and is arranged at a central portion of said first gear member.

15. The apparatus for detecting a projection angle of a projection system for displaying a picture as claimed in claim 14, wherein said first base panel having a first logic pattern portion formed with a plurality of fan shapes which have the same central angle and are radially formed with reference to a central point of said first base panel on both surfaces of said first base panel in order to transmit or cut off light signals from said light-emitting elements included in said photo-detector.

16. The apparatus for detecting a projection angle of a projection system for displaying a picture as claimed in claim 15, wherein said first logic pattern portion includes both a first light transmitting pattern and a first light cutting pattern disposed sequentially in order to represent predetermined bits of logic value by light signals which are transmitted or cut off.

17. The apparatus for detecting a projection angle of a projection system for displaying a picture as claimed in claim 16, wherein said first light transmitting pattern transmits the light signal from said light-emitting element and represents a high level of a digital value.

18. The apparatus for detecting a projection angle of a projection system for displaying a picture as claimed in claim 16, wherein said first light cutting pattern cuts off the light signal from said light-emitting element and represents a low level of a digital value.

19. An apparatus for detecting a projection angle of a projection system for displaying a picture, said apparatus comprising:

an adjusting knob rotated clockwise or counterclockwise by a user's hand;

an adjusting knob body having a cylindrical shape and having a screw structure on a peripheral surface thereof in order to screw-connect to a screw hole of said projection system for displaying a picture, said body integrally being formed with said adjusting knob;

a power transmission member having a worm shape and connecting with said body of said adjusting knob body;

a first gear member having logic patterns on both surfaces thereof and connecting with a first screw forming portion of said power transmission member in order to rotate when said power mission member moves upwards or downwards;

a second gear member, screw-connecting with a second screw forming portion of said power transmission member, for supporting said projection angle adjusting means;

a photo-detector including a plurality of light-emitting elements and a plurality of light-receiving elements disposed in one to one opposition to each other, having each of said logic patterns of said first gear member placed therebetween, and being for providing a light detection signal by means of said light-emitting elements and said light-receiving elements;

computing means for computing a projection angle of a projection lens with respect to a screen on the basis of the light detection signal from said photo-detector, and for providing the computed projection angle to a pre-compensating means for pre-compensating an asymmetrical picture; and projection angle storing means for storing data used when said computing means computes the projection angle on the basis of the combination of logic patterns of said first gear member in order to read out the data in a lookup table manner.

20. The apparatus for detecting a projection angle of a projection system for displaying a picture as claimed in claim 19, wherein said first gear member comprises a first screw portion formed on a peripheral surface thereof in order to rotate together with with said first screw forming portion of said power transmission member while being engaged therewith; and a first base panel which is comprised of a transparent material and is arranged at a central portion of said first gear member.

21. The apparatus for detecting a projection angle of a projection system for displaying a picture as claimed in claim 20, wherein said first base panel having a first logic pattern portion formed with a plurality of fan shapes which have the same central angle and are radially formed with reference to a central point of said first base panel on both surfaces of said first base panel in order to transmit or cut off light signals from said light-emitting elements included in said photo-detector.

22. The apparatus for detecting a projection angle of a projection system for displaying a picture as claimed in claim 21, wherein said first logic pattern portion includes both a first light transmitting pattern and a first light cutting pattern disposed sequentially in order to represent predetermined bits of logic value by light signals which are transmitted or cut off.

23. The apparatus for detecting a projection angle of a projection system for displaying a picture as claimed in claim 22, wherein said first light transmitting pattern transmits the light signal from said light-emitting element and represents a high level of a digital value.

24. The apparatus for detecting a projection angle of a projection system for displaying a picture as claimed in claim 22, wherein said first light cutting pattern cuts off the light signal from said light-emitting element and represents a low level of a digital value.

* * * * *